UNITED STATES PATENT OFFICE.

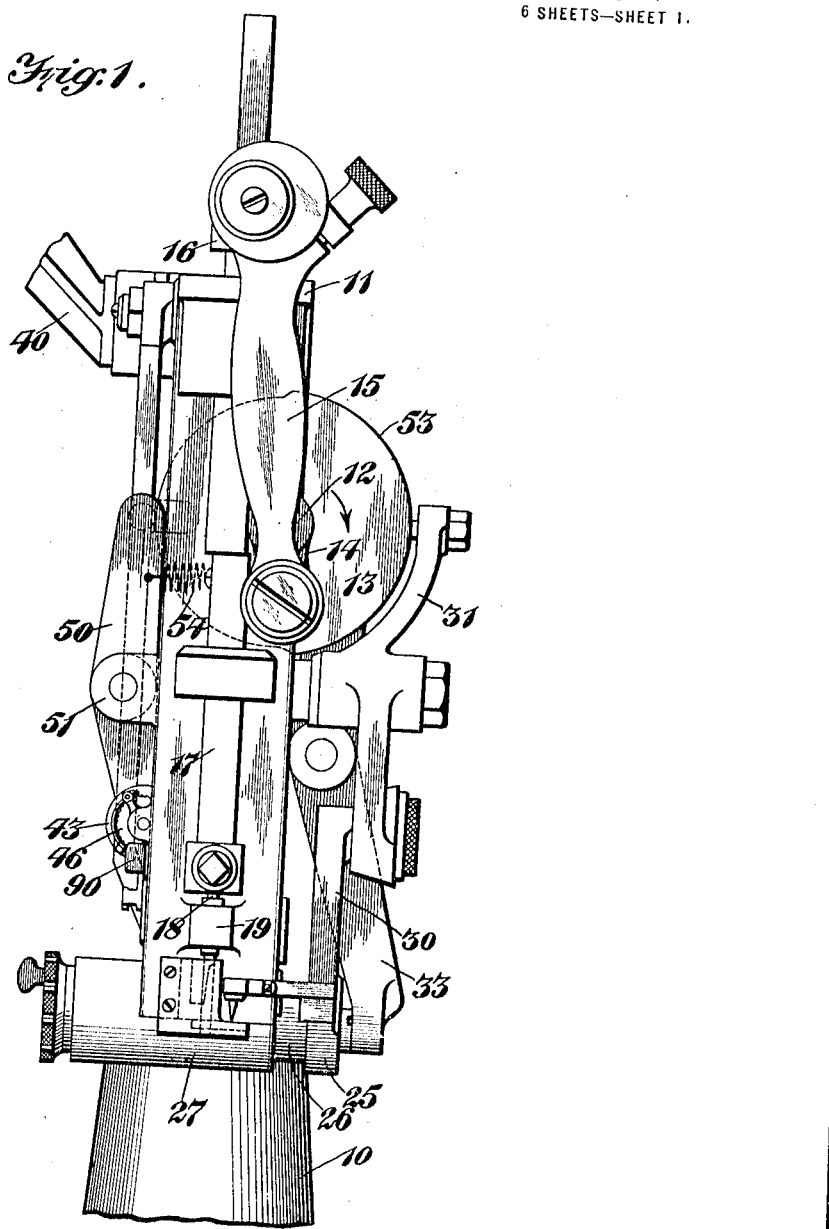

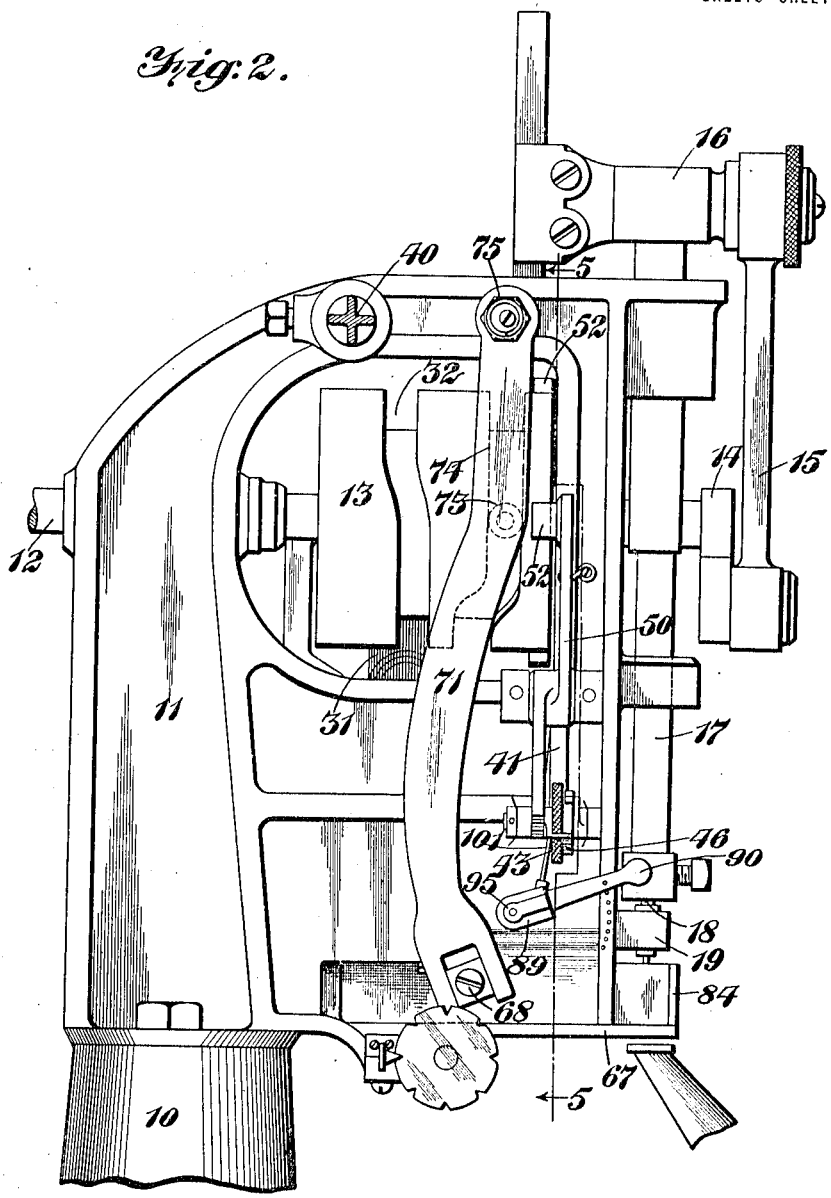

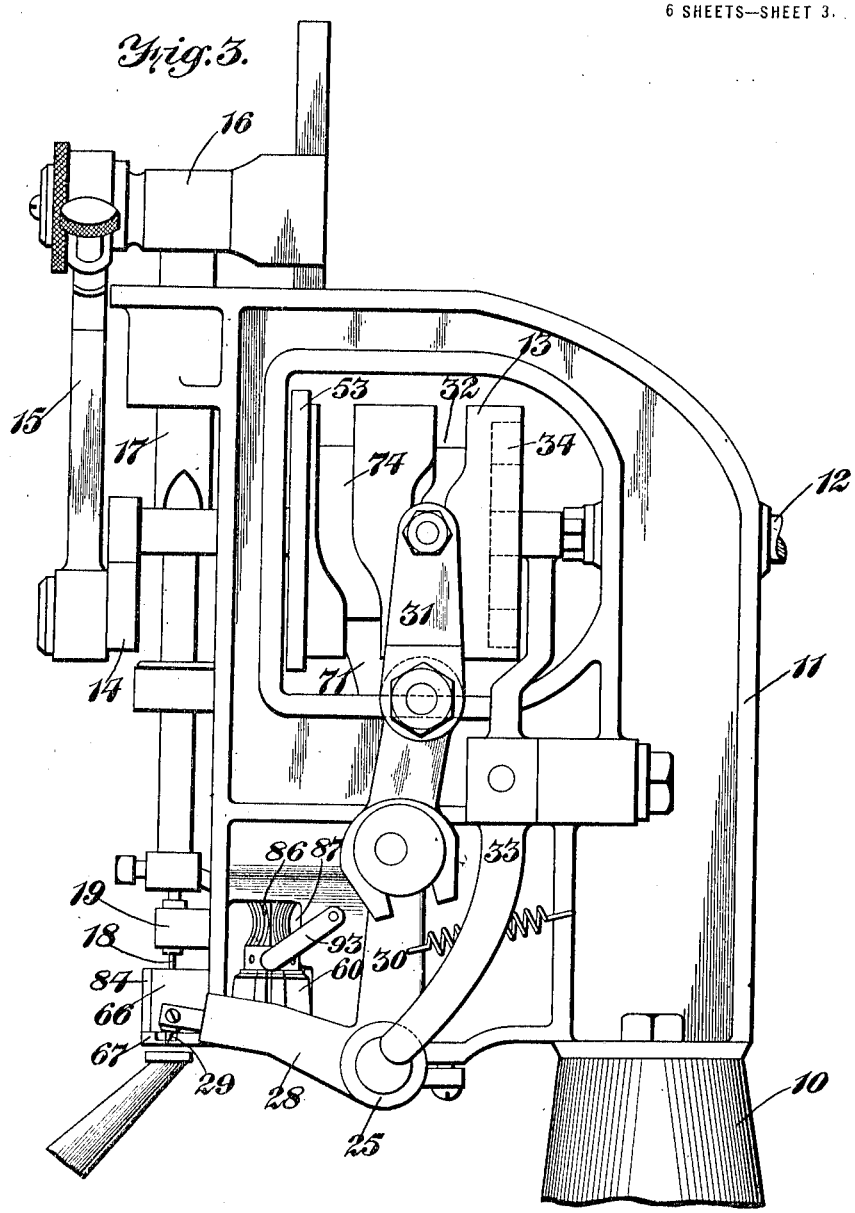

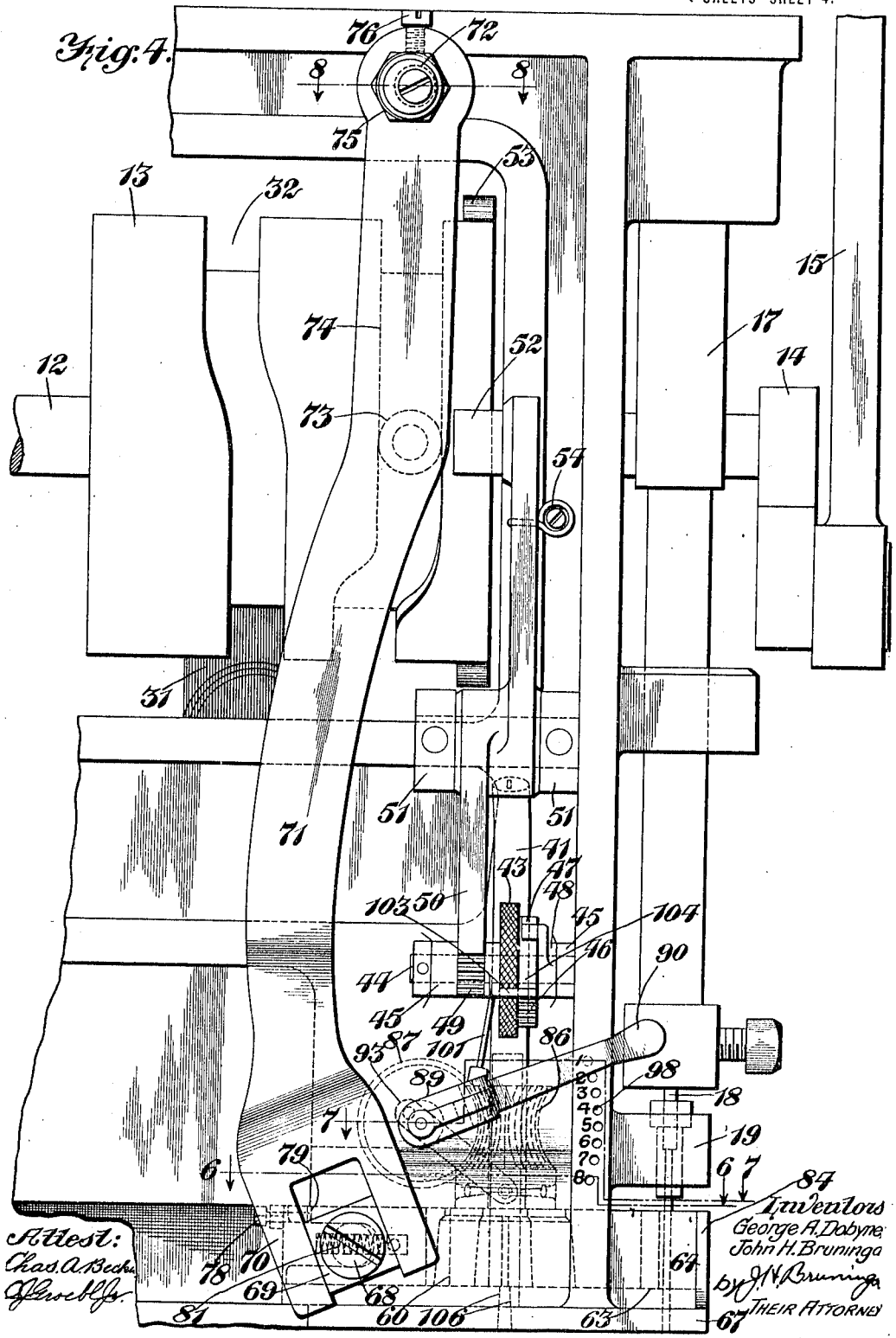

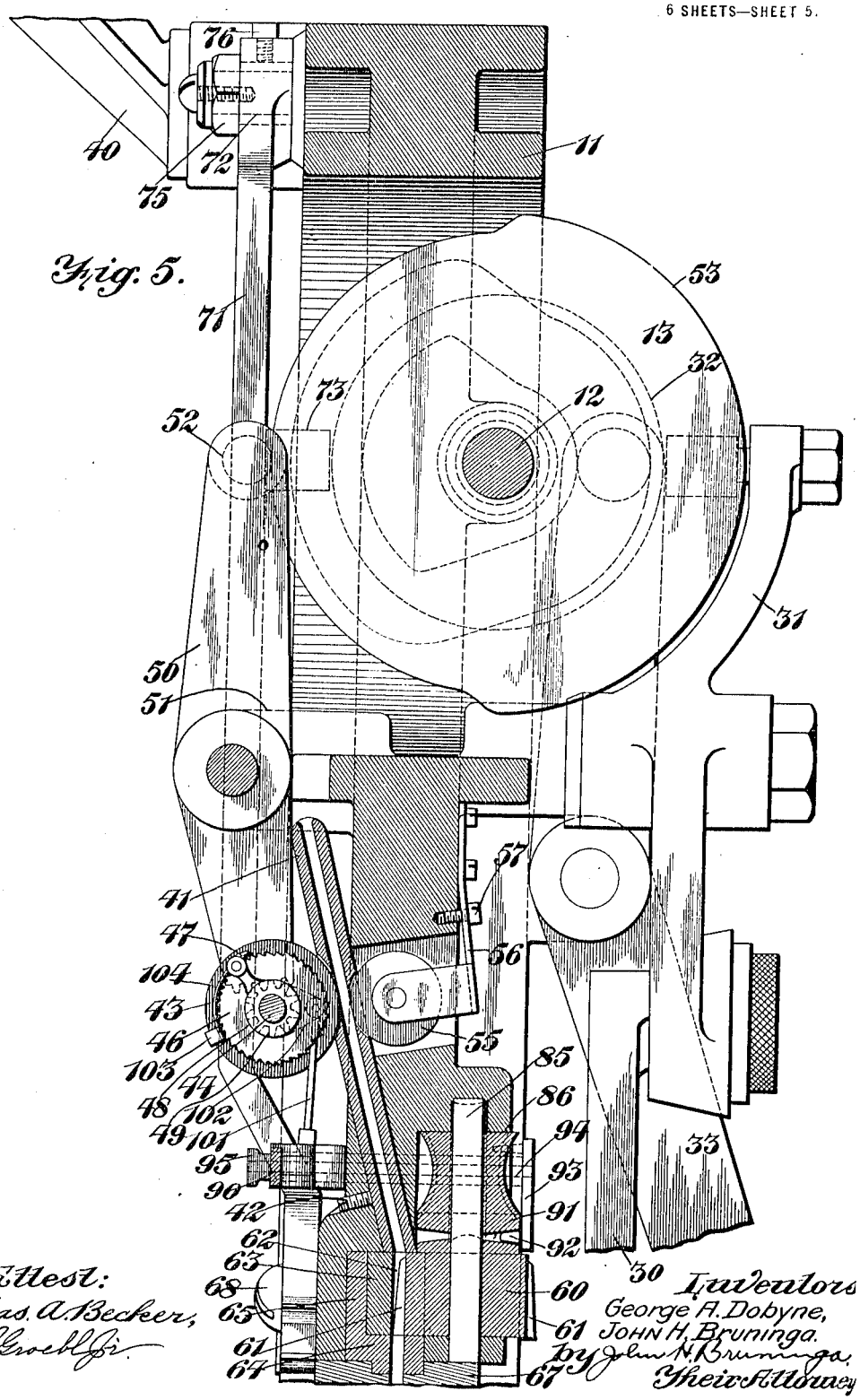

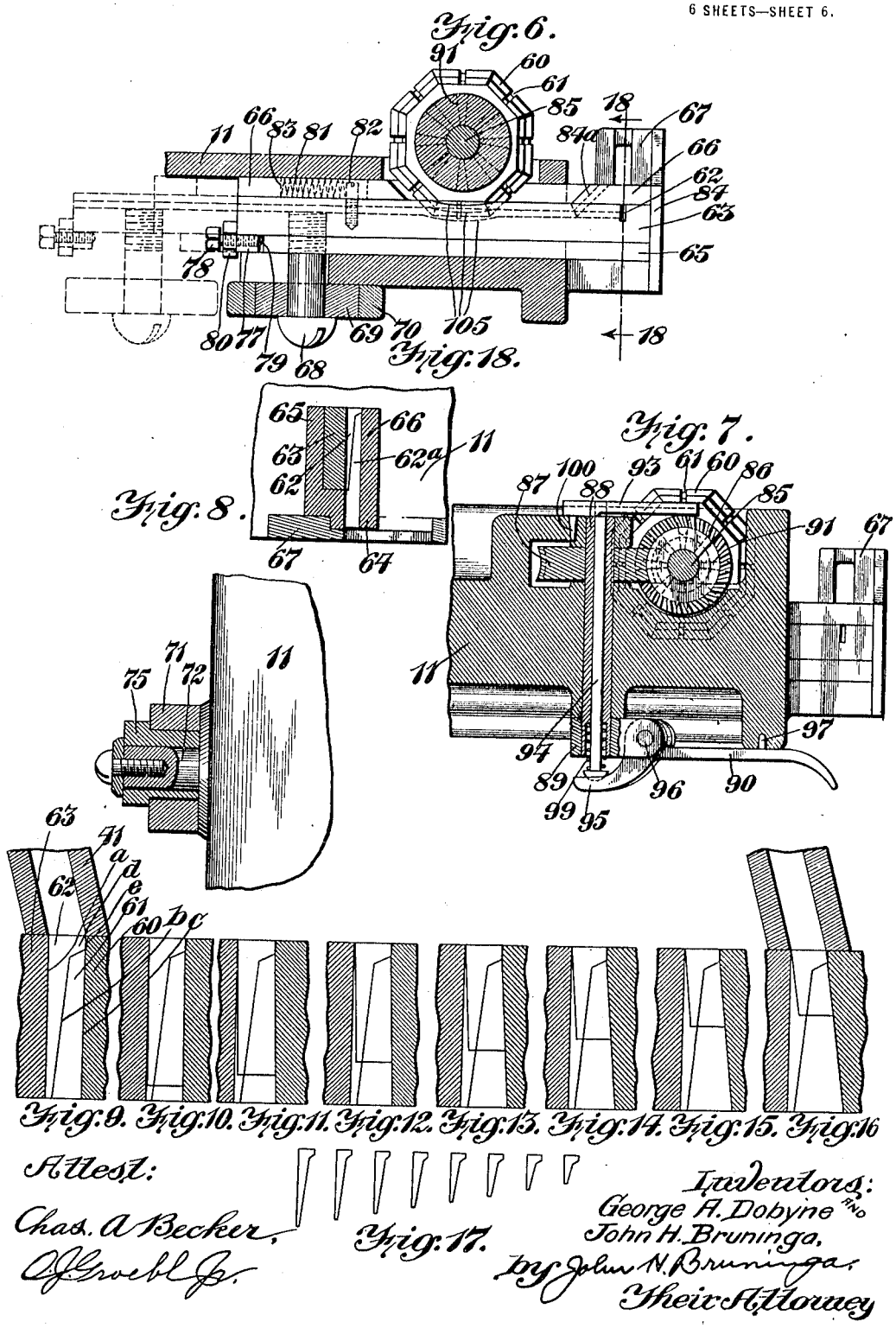

GEORGE A. DOBYNE AND JOHN H. BRUNINGA, OF ST. LOUIS, MISSOURI, ASSIGNORS TO CHAMPION SHOE MACHINERY COMPANY, OF ST. LOUIS, MISSOURI, A CORPORATION OF MISSOURI.

FASTENER-FORMING MECHANISM FOR FASTENER-INSERTING MACHINES.

1,309,566.  Specification of Letters Patent.  Patented July 8, 1919.

Application filed September 18, 1913. Serial No. 790,415.

*To all whom it may concern:*

Be it known that we, GEORGE A. DOBYNE and JOHN H. BRUNINGA, citizens of the United States, and residing at St. Louis, in the State of Missouri, have invented certain new and useful Improvements in Fastener-Forming Mechanism for Fastener-Inserting Machines, of which the following is a specification.

This invention relates to fastener forming mechanism, and more particularly to fastener machines of the type in which the fasteners are formed in the machine and driven.

One of the objects of this invention is to construct a machine which will automatically form fasteners having well defined heads.

Another object is to produce a machine which is capable of adjustment to form fasteners of different lengths, but which is so constructed as to form a well defined uniform point on the fastener irrespective of its length.

Further objects will appear from the detail description taken in connection with the accompanying drawings, in which:

Figure 1 is a front elevation of a machine embodying this invention,

Fig. 2 is a side elevation from the left side of the machine,

Fig. 3 is a side elevation from the right side of the machine,

Fig. 4 is an enlarged detail side elevation from the left side of the machine,

Fig. 5 is a section on the line 5—5 Fig. 2,

Fig. 6 is a section on the line 6—6 Fig. 4,

Fig. 7 is a section on the line 7—7 Fig. 4,

Fig. 8 is a section on the line 8—8 Fig. 4,

Figs. 9 to 16 inclusive are detail sectional views showing the different die apertures, Fig. 17 is a view showing the nails as formed, and Fig. 18 is a detail section on the line 18—18 Fig. 6.

Referring to the accompanying drawings, 10 designates a post or pillar supporting a machine head 11, which machine head has mounted thereon the different mechanisms. A main drive shaft 12 is mounted in this machine head and has rigidly secured thereto a cam wheel 13 and a crank 14. The crank is connected by a pitman 15 with a cross head 16 on a driver bar 17 sliding vertically in bearings on the machine head and having a driver 18 working in a guide 19.

An awl carrier 25 has a shank 26 sliding and rotating in a bearing 27 on the machine head. This awl carrier has an arm 28 carrying an awl 29, and has an arm 30 connected to a lever 31 pivoted on the machine head, which lever has a cam roll working in a cam groove 32 in the cam wheel 13. A lever 33 pivoted on the machine head engages at one end wth the awl carrier and has a cam roll at its other end engaging a cam groove 34 in the cam wheel 13. The construction so far described is substantially shown and described in Patent No. 1,091,298 March 24, 1914.

A bracket 40 on the machine head supports a reel, (not shown) which reel carries a supply of fastener stock, which in this case is in the form of a plain wire, either flat or round. A tube or quill 41 of steel is mounted in the machine head and secured in position by a screw 42, so as to guide the fastener stock to the cutting or die mechanism hereinafter to be described. This quill is recessed to receive a knurled feed wheel 43, loosely mounted on a shaft 44, which in turn is mounted for rotation in brackets 45 on the machine head. This wheel has rigidly secured thereto or formed integral therewith a ratchet 46 engaged by a pawl 47 on a hub 48 rigidly secured to the shaft 44. The shaft 44 has rigidly secured thereto a gear 49 meshing with teeth on one arm of a lever 50, which lever is pivoted in brackets 51 on the machine head and is provided with a cam roll 52 adapted to be engaged by a cam rib 53 on the cam wheel 13. The cam 53 operates to move the lever 50 in such a direction as to cause the pawl to rotate the ratchet, and this lever together with the pawl are returned by a spring 54 connected at one end to the lever and at the other end to the machine head. A smooth pressure wheel 55 is mounted on a spring arm 56 and bears against the edge of the wire opposite the feed wheel, and the tension of this pressure wheel is adjusted by means of an adjusting screw 57.

A turret 60 is mounted in the machine head and this turret is provided with a series of die recesses 61. These die recesses may be formed directly in the turret or in separate plates secured to the turret. The turret as thus constructed forms one of the die members of a pair of coöperating dies or cutters. A coöperating die recess or aperture 62 is formed in the coöperating die member 63 which is in the form of a slide. This slide is embraced by a channel shaped slide 64 having side members 65 and 66, and the side member 66 has a recess 62$^a$ to form with the recess 62 a throat. The slides 63 and 64 are mounted in guideways formed in the machine head, and secured by a plate 67 bolted to the machine head and forming the presserfoot. A bolt or pin 68 passing through an open slot in the member 65 of the slide 64 and secured to the slide 63, has a block 69 engaging a fork 70 on a lever 71, pivoted on a pin 72 on the machine head and provided with a cam roll 73 engaging a cam groove 74 in the cam wheel 13. An eccentric sleeve 75 is interposed between the lever 71 and the pin 72 so as to form an adjustable bearing for the lever. This sleeve is provided with an angular portion whereby it may be adjusted, and is clamped in adjusted position by means of a clamping screw 76. The slide 63 has a laterally extending lug 77 carrying an adjusting screw 78 adapted to engage an end face 79 on the slide 64, and this screw is locked in position by a lock nut 80. A spring 81 is mounted in a slot in the side member 66 of the slide 64, and bears at one end against a pin 82 on the slide 63 and at its other end against the end 83 of the slot. The presserfoot 67 has a member 84 forming a stop for the slides 63 and 64. The slides 63 and 64 form together a nail carrier, while the slide 63 forms one of the die members of a pair of coöperating dies, of which the turret forms the other die member. The slides are connected together through the screw 78 and the spring 81, whereby the slide 63 will move the slide 64 positively forward and yieldingly rearward. It will be understood that the die recess 62 as well as the recess 62$^a$ may be formed in hardened plates set into the slides. The die members including the turret 60, the slide 63 and the bottom of the quill 41 are hardened, tempered and ground.

The operation of the mechanism so far described is as follows: When the lever 71 is moved rearwardly from the position shown in full lines, the slides 63 and 64 will first move together until the shoulder 84$^a$ abuts against the turret; the slide 64 will then remain stationary while the slide 63 continues in its movement to the position shown in dotted lines, Fig. 6. In the rearmost position of the lever 71 and the slide 63 the recess 62 will be placed in alinement with the coöperating recess 61 in the turret. The lever will then remain stationary for a short period while the cam roll 73 travels in the straight portion of the cam groove 74, and during this period the cam 53 will then engage the cam roll 52 to actuate the pawl and ratchet and cause the feed wheel 43 to feed the end of the wire from the quill into the alined recesses 62 and 61. After the wire has been fed the cam 74 will move the lever 71 forwardly and cause the slide 63 to move forwardly with respect to the turret 60 and the end of the quill 41 so as to cause these three die members to coöperate to form the nail as shown in Fig. 18, the die members 60 and 63 coöperating to cut a piece out of one edge of the wire, while the die members 63 and 41 coöperate to sever the nail from the wire. These three die members coöperate simultaneously to form a nail having a well defined laterally extending head and a tapering shank. The nail so formed is carried forward by the slide 63, and during the first part of the forward movement of the slide 63 the slide 64 will remain stationary. The slide 63 will continue forwardly while the slide 64 remains stationary until the screw 78 engages the shoulder 79, at which time the recess 62 will be opposite the recess 62$^a$ of the slide 64, and thereafter the slides 62 and 64 will move together so as to place the alined recesses 62 and 62$^a$ with the nail therein underneath the driver. The slides are then held in this position while the cam roll 73 runs in the straight part of the cam groove 74, and during this period the driver descends to drive the nail through the throat, formed by the alined recesses 62 and 62$^a$, into the work. While the slides 63 and 64 are in their rearward position, with the shoulder 84$^a$ abutting against the turret, the inside face of the side member 66 will form a continuation of the die face of the turret so as to hold the cut nail in the die recess 62 until the latter is placed in alinement with the recess 62$^a$. The slide is held in position with its shoulder 84$^a$ engaging the turret, by the spring 81, which is compressed when the slide 63 is in its rearward position.

It will therefore be seen that during each revolution of the drive shaft the wire will be fed, the nail formed, and the nail thus formed positioned underneath the driver and driven. During a revolution of the shaft the awl is operated to first pierce the work and then move the work in the line of feed. The awl will therefore first move down, then to the left, Fig. 1, underneath the driver, then rise, and then move back to the right. The operation of the awl is the same as in the patent referred to above. The awl mechanism is so timed with respect to the movement of the slides 63 and 64, that these slides will be moved out of the way to permit movement of the awl into the line of drive. The alinement of the slides 63 and 64, and of the coöperating recesses 62 and 62ª, with respect to the driver can be accurately adjusted by means of the eccentric sleeve 75, while the slide 64 can be adjusted with respect to the slide 63 so as to accurately aline the recess 62ª with respect to the recess 62, by means of the adjusting screw 78.

In order to adapt the machine for nails of different lengths it is necessary to vary the feed of the fastener stock. In order also that the size of the points on the nails of the different sizes may be uniform, means must be provided for adjusting the cutting mechanism so as to obtain this result. This is accomplished by providing a series of dies, one for each nail, or more specifically, by forming one of the coöperating dies or cutting members as a turret having a series of dies or die recesses. The series of dies or die recesses on the turret 60 are shown in Figs. 9 to 16 inclusive. It will be noted that since the die member 63 is not changed, the wall a of the recess 62 and the coöperating die faces b between the die members 60 and 63 will remain unchanged. In accordance with this invention, however, the rear walls c of the dies 61 are so cut as to be positioned at different inclinations with respect to the die faces b, and therefore at different angles with respect to the quill 41 and the fastener stock therein. The quill is so arranged with respect to the walls c that the angle between this quill and a wall c will increase progressively from the die for the longest nail to the die for the shortest nail. This angle is however, slightly less than 180° for the greatest angle and for the shortest nail, as shown in Fig. 16. This will insure that when the wire is fed into the die recesses the wire will always be placed evenly in engagement with the wall c, so that the wire will always lie thereagainst and will be positioned with this wall as a guide. The rib d of the die member 63 also extends slightly underneath the quill as shown at e in Figs. 9 to 16 inclusive; this results in a smooth cut of the wire, and also insures that this wire will lie evenly along the wall c without bending or curling. With a series of dies constructed as shown in Figs. 9 to 16 inclusive the points of the fasteners will be of the same size for different sized nails.

A series of dies or die recesses are arranged progressively, as shown in Figs. 9 to 16 inclusive, around the turret 60. This turret is loosely mounted on a shaft 85 in a recess in the machine head, and in proper position with respect to the coöperating die members 41 and 63. The turret has secured thereto or formed integral therewith a spiral gear 86 which meshes with a spiral gear 87 on a hollow shaft 88 extending through the machine head, and having rigidly secured thereto a collar or support 89 provided with a handle 90. The turret has also formed therein a series of radially positioned slightly tapering holes 91, one for each die recess 61, adapted to be engaged by a tapering pin 92 on a cross head 93 mounted on a sliding shaft 94. The shaft 94 extends through the shaft 88 and is engaged by a lug 95 on the handle 90. The handle 90 is pivoted to the collar 89 at 96 and has a latching lug 97 adapted to engage a series of recesses 98 in the machine head. A spring 99 is interposed between the headed end of the shaft 94 and the shaft 88 so as to normally hold the cross head 93 with its pin 92 in engagement with one of the recesses 91. A pin 100 of the cross head 93 engages a guide hole in the machine head so as to hold this cross head against turning. The collar 89 is connected by a link 101 with an arm 102 loosely mounted on the shaft 44, and having connected thereto an arm 103 carrying a guard 104 for the ratchet 46.

When the arm 90 is swung in its pivot 96 to move the latching lug 97 out of its recess 98, the lug 95 will move the cross head 93 to move the lug 92 thereon out of its recess 91. The turret will now be unlocked and can be rotated by moving the arm 90 up and down. The gear ratio of the spiral gears 86 and 87 can be so selected that a movement of the handle 90 from one extreme position to the other will cause a complete rotation of the turret. The turret can therefore be rotated to place any of its dies in alinement with the quill, and after the handle 90 is released to permit its lug 97 to snap into the proper recess 98, the pin 92 will snap into its coöperating recess 91, so as to lock the turret in adjusted position. As is well known to those skilled in the art, shifting of the guard 104 will vary the effective movement given the ratchet 46 by the pawl 47. By means of the handle 90 both the feed of the wire and the positioning of the proper die are varied to progressively shift the dies from Fig. 9 to Fig. 16 with a decrease in wire feed. It will thus be seen that by a single movement of the lever, the feeding mechanism can be adjusted for a selected length nail, and during this adjustment of the feed, the die mechanism will be adjusted automatically so as to place it in proper condition to cut the selected length of nail in such a manner as to provide a given point, and this point is uniform for all sizes of nails. In order to permit rotation of the turret the slide 63 is cut away as shown at 105 to allow the turret to clear. The plate 67 and the slide 64 are provided with apertures 106 so as to permit the waste chips to drop therethrough.

It is therefore obvious that various changes may be made in the details of this construction, within the scope of the appended claims, without departing from this invention, and it is therefore to be understood that this invention is not to be limited to the specific construction shown and described.

Having thus described the invention what is claimed is:

1. In a machine of the class described, the combination with fastener stock feeding mechanism, of a series of differently shaped dies adapted to operate on fastener stock, a single die adapted to coöperate with the dies of said series, and means for selectively positioning a die of said series with respect to said single die, adapted to form different sized fasteners.

2. In a machine of the class described, the combination with fastener stock feeding mechanism, of a series of differently shaped dies, a single die adapted to coöperate with the dies of said series, and means for selectively positioning a die of said series with respect to said single die, constructed and arranged to cut different amounts out of the edge of the fastener stock to form different sized fasteners.

3. In a machine of the class described, the combination with fastener stock feeding mechanism, of a series of differently shaped dies, a single die adapted to coöperate with the dies of said series, and means for selectively positioning a die of said series with respect to said single die, constructed and arranged to cut different amounts of the edge of the fastener stock to form fasteners of different lengths but having like points.

4. In a machine of the class described, the combination with fastener stock feeding mechanism, of a series of dies adapted to operate on fastener stock, a single die adapted to coöperate with the dies of said series, and means for selectively positioning a die of said series with respect to said single die, adapted to form fasteners of different lengths with like points.

5. In a machine of the class described, the combination with fastener stock supporting and feeding mechanism, of a series of dies together with means coöperating with said dies adapted to operate on the fastener stock, and means for selectively positioning said dies with respect to the supported fastener stock, adapted to form different sized fasteners.

6. In a machine of the class described, the combination with fastener stock supporting and feeding mechanism, of a series of dies, each having means for positioning the fastener stock with respect to its cutting edge, means coöperating with said dies to form fasteners, and means for selectively positioning said dies with respect to the supported fastener stock, adapted to form different sized fasteners.

7. In a machine of the class described, the combination with fastener stock supporting and feeding mechanism, of a series of dies having means for positioning the fastener stock of different angular relations with respect to their cutting edges, means coöperating with said dies to form fasteners, and means for selectively positioning said dies with respect to the supported fastener stock, adapted to form different sized fasteners.

8. In a machine of the class described, the combination with fastener stock supporting and feeding mechanism, of a series of dies having symmetrically arranged cutting edges, means coöperating with said dies to form fasteners, and means for selectively positioning said dies with respect to the supported fastener stock, adapted to form different sized fasteners.

9. In a machine of the class described, the combination with fastener stock supporting and feeding mechanism, of a series of dies having symmetrically arranged cutting edges and having means for positioning the fastener stock with respect to said cutting edges, means coöperating with said dies to form fasteners, and means for selectively positioning said dies with respect to the supported fastener stock, adapted to form different sized fasteners.

10. In a machine of the class described, the combination with fastener stock supporting and feeding mechanism, of a series of dies having symmetrically arranged cutting edges and having means for positioning the fastener stock in different relations with respect to said cutting edges, means coöperating with said dies to form fasteners, and means for selectively positioning said dies with respect to the supported fastener stock, adapted to form different sized fasteners.

11. In a machine of the class described, the combination with fastener stock supporting and feeding mechanism, of a series of dies together with means coöperating with said dies to form fasteners, said dies having their cutting edges in the same angular relation and having means for positioning the fastener stock in different angular relations with respect to said coöperating means, and means for selectively positioning said dies with respect to the supported fastener stock, adapted to form different sized fasteners.

12. In a machine of the class described, the combination with fastener supporting stock feeding mechanism, of a die, a series of dies adapted to coöperate with said first die, and means for selectively positioning said second dies with respect to said first die, adapted to form different sized fasteners.

13. In a machine of the class described, the combination with fastener stock feeding mechanism, of a die, a series of dies adapted to coöperate with said first die, means for positioning the fastener stock with respect to said dies, and means for selectively positioning said second dies with respect to said first die, adapted to form different sized fasteners.

14. In a machine of the class described, the combination with fastener stock feeding mechanism, of a die, a series of dies adapted to coöperate with said first die, and having means for positioning the fastener stock in different relations, with respect to said first die, and means for selectively positioning said second dies with respect to said first die, adapted to form different sized fasteners.

15. In a machine of the class described, the combination with fastener stock feeding mechanism, of a die, a series of dies constructed to coöperate with the first die and having means for positioning the fastener stock in different relations with respect to the cutting edges of said dies, and means for selectively positioning said second dies with respect to said first die, adapted to form different sized fasteners.

16. In a machine of the class described, the combination with fastener stock supporting and feeding mechanism, of a die, a series of dies each having a cutting edge and a fastener stock engaging face and adapted to coöperate with said first die, and means for selectively positioning said second dies with respect to the supported fastener stock, adapted to form different sized fasteners.

17. In a machine of the class described, the combination with fastener stock supporting and feeding mechanism, of a series of dies, together with means coöperating with said dies to form fasteners, said dies having cutting edges and fastener stock engaging faces positioned respectively in different relations with respect to said coöperating means, and means for selectively positioning said dies with respect to the supported fastener stock, adapted to form different sized fasteners.

18. In a machine of the class described, the combination with fastener stock supporting and feeding mechanism, of a series of dies, together with means coöperating with said dies to form fasteners, said dies having cutting edges and fastener stock engaging faces positioned respectively in different angular relations with respect to said coöperating means, and means for selectively positioning said dies with respect to the supported fastener stock, adapted to form different sized fasteners.

19. In a machine of the class described, the combination with fastener stock supporting and feeding mechanism, of a series of dies, together with means coöperating with said dies to form fasteners, said dies having die recesses the fastener stock engaging walls of which are positioned in different relations with respect to said coöperating means, and means for selectively positioning said dies with respect to the supported fastener stock, adapted to form different sized fasteners.

20. In a machine of the class described, the combination with fastener stock supporting and feeding mechanism, of a series of dies, together with means coöperating with said dies to form fasteners, said dies having die recesses and cutting edges positioned respectively in different angular relations with respect to said coöperating means, and means for selectively positioning said dies with respect to the supported fastener stock, adapted to form different sized fasteners.

21. In a machine of the class described, the combination with a fastener stock guide, of die mechanism having means adapted to position a plurality of fastener stock engaging walls in different angular relations with respect to said fastener stock guide, and means coöperating with said die mechanism to form fasteners.

22. In a machine of the class described, the combination with a fastener stock guide, of die mechanism comprising cutting edges together with a plurality of fastener stock engaging walls in different angular relations with respect to said cutting edges, and means coöperating with said die mechanism to form fasteners.

23. In a machine of the class described, the combination with a fastener stock guide, of die mechanism comprising cutting edges positioned in fixed angular relation with respect to said fastener stock guide together with a plurality of fastener stock engaging walls in different angular relations with respect to said cutting edges, and means coöperating with said die mechanism to form fasteners.

24. In a machine of the class described, the combination with a fastener stock guide, of a series of dies having fastener stock engaging walls in different angular relations with respect to said fastener stock guide, and means coöperating with said dies to form fasteners.

25. In a machine of the class described, the combination with a fastener stock guide, of a series of dies having fastener stock engaging walls in different angular relations with respect to said fastener stock guide, means coöperating with said dies to form fasteners, and means for selectively positioning said dies with respect to said fastener stock guide.

26. In a machine of the class described, the combination with a fastener stock guide, of a series of dies, together with means coöperating with said dies to form fasteners, said dies having fastener stock engaging walls in different angular relations with respect to said coöperating means when in coöperative relation therewith, and means for selectively positioning said dies with respect to said fastener stock guide.

27. In a machine of the class described, the combination with a fastener stock guide, of die mechanism and fastener stock guiding walls, together with means for selectively positioning a plurality of said fastener stock guiding walls in different angular relations with respect to said fastener stock guide.

28. In a machine of the class described, the combination with a fastener stock guide, of die mechanism having cutting edges and fastener stock guiding walls, together with means for selectively positioning a plurality of said fastener stock guiding walls in different angular relations with respect to said cutting edges.

29. In a machine of the class described, the combination with a fastener stock guide, of a die, a series of dies coöperating with said first die, said second dies having fastener stock engaging walls positioned in different angular relations with respect to said first die.

30. In a machine of the class described, the combination with a fastener stock guide, of a die, a series of dies coöperating with said first die, said second dies having fastener stock engaging walls positioned in different angular relations with respect to said first die, and means for selectively positioning said dies with respect to said fastener stock guide and said first die.

31. In a machine of the class described, the combination with a fastener stock guide, of a die, a series of dies coöperating with said first die, said second dies having fastener stock engaging walls positioned in different angular relations with respect to said fastener stock guide, and means coöperating with said dies to form fasteners.

32. In a machine of the class described, the combination with a fastener stock guide, of a series of dies having fastener stock engaging walls positioned at progressively decreasing angles with respect to said fastener stock guide, and means coöperating with said dies to form fasteners.

33. In a machine of the class described, the combination with a fastener stock guide, of a series of dies having fastener stock engaging walls positioned at progressively decreasing angles with respect to said fastener stock guide, means coöperating with said dies to form fasteners, and means for progressively shifting said dies with respect to said fastener stock guide.

34. In a machine of the class described, the combination with a fastener stock guide and feeding mechanism, of a turret having a series of different shaped dies thereon adapted to operate on the fastener stock, means coöperating with said dies to form fasteners, and means for shifting said turret to position a selected die with respect to said fastener stock guide, adapted to form a fastener of a selected size.

35. In a machine of the class described, the combination with a fastener stock guide and feeding mechanism, of a turret having a series of different shaped dies thereon adapted to operate on the fastener stock, means coöperating with said dies to form fasteners, means for shifting said turret to position a selected die with respect to said fastener stock guide, adapted to form a fastener of a selected size, and means for locking said turret.

36. In a machine of the class described, the combination with a fastener stock guide and feeding mechanism, of a turret having a series of different shaped dies thereon adapted to operate on the fastener stock, means coöperating with said dies to form fasteners, means for shifting said turret to position a selected die with respect to said fastener stock guide, adapted to form a fastener of a selected size, means for locking said turret, and means for operating said locking and shifting means.

37. In a machine of the class described, the combination with a fastener stock guide and feeding mechanism, of a turret having a series of different dies thereon adapted to operate on the fastener stock, means coöperating with said dies to form different sized fasteners, means for shifting said turret to position a selected die with respect to said fastener stock guide, adapted to form a fastener of a selected size, means for locking said turret, and an operating member adapted to first unlock and then shift said turret.

38. In a machine of the class described, the combination with a fastener stock guide and feeding mechanism, of a turret having a series of different dies thereon adapted to operate on the fastener stock, means coöperating with said dies to form different sized fasteners, means for shifting said turret to position a selected die with respect to said fastener stock guide, adapted to form a fastener of a selected size, means for locking said turret, and an operating member having a compound movement to operate said locking and shifting means.

39. In a machine of the class described, the combination with a fastener stock guide and feeding mechanism, of a series of different shaped dies adapted to operate on the fastener stock, means coöperating with said dies to form fasteners, means for shifting said dies to position a selected die with respect to said fastener stock guide, adapted to form a fastener of a selected size, and means for locking said dies in operative position.

40. In a machine of the class described, the combination with a fastener stock guide and feeding mechanism, of a series of different shaped dies adapted to operate on the fastener stock, means coöperating with said dies to form fasteners, means for shifting said dies to position a selected die with respect to said fastener stock guide, adapted to form a fastener of a selected size, means for locking said dies in operative position, and an operating member having a compound movement to operate said locking and shifting means.

41. In a machine of the class described, the combination with a fastener stock guide and feeding mechanism, of a series of dies adapted to operate on the fastener stock, means coöperating with said dies to form fasteners, means for shifting said dies to position a selected die with respect to said fastener stock guide, and means for adjusting said feeding mechanism for different sized fasteners.

42. In a machine of the class described, the combination with a fastener stock guide and feeding mechanism, of a series of dies adapted to operate on the fastener stock, means coöperating with said dies to form fasteners, means for shifting said dies to position a selected die with respect to said fastener stock guide, means for locking said dies in operative position, and means for adjusting said feeding mechanism for different sized fasteners.

43. In a machine of the class described, the combination with a fastener stock guide and feeding mechanism, of a series of dies adapted to operate on the fastener stock, means coöperating with said dies to form fasteners, means for shifting said dies to position a selected die with respect to said fastener stock guide, means for adjusting said feeding mechanism for different sized fasteners, and an operating member for said shifting and adjusting means.

44. In a machine of the class described, the combination with a fastener stock guide and feeding mechanism, of a series of dies adapted to operate on the fastener stock, means coöperating with said dies to form fasteners, means for shifting said dies to position a selected die with respect to said fastener stock guide, means for locking said dies in operative position, means for adjusting said feeding mechanism for different sized fasteners, and an operating member for said shifting, locking and adjusting means.

45. In a machine of the class described, the combination with variable fastener stock feeding mechanism, of a series of dies and coacting means coöperating with said fastener stock feeding mechanism to cut different amounts out of the edge of the fastener stock, adapted to form different sized fasteners.

46. In a machine of the class described, the combination with variable fastener stock feeding mechanism, of a series of dies and coacting means coöperating with said fastener stock feeding mechanism to cut different amounts out of the edge of the fastener stock, adapted to form fasteners of different lengths with like points.

47. In a machine of the class described, the combination with fastener stock feeding mechanism, of a series of dies and coacting means adapted to coöperate with the fastener stock, and means for concurrently adjusting said fastener stock feeding mechanism and for selectively positioning said dies with respect to the fastener stock, adapted to form different sized fasteners.

48. In a machine of the class described, the combination with fastener stock feeding mechanism, of a series of dies having means for positioning the fastener stock in different angular relations with respect to their cutting edges, means coöperating with said dies to form fasteners, means for adjusting said fastener stock feeding mechanism, and means for selectively positioning said dies with respect to the fastener stock, adapted to form different sized fasteners.

49. In a machine of the class described, the combination with fastener stock feeding mechanism, of a die, a series of different dies adapted to coöperate with said first die, means for adjusting said fastener stock feeding mechanism for different sized fasteners, and means for selectively positioning said second dies with respect to said first die, adapted to form fasteners of a selected size.

50. In a machine of the class described, the combination with a fastener stock guide and fastener stock feeding mechanism, of a series of dies having fastener stock engaging walls in different angular relations, means coöperating with said dies to form fasteners, means for adjusting said fastener stock feeding mechanism, and means for selectively positioning said dies with respect to said fastener stock guide.

51. In a machine of the class described, the combination with a fastener stock guide and fastener stock feeding mechanism, of die mechanism and fastener stock guiding walls, together with means for selectively positioning a plurality fastener stock guiding walls in different angular relations with respect to said fastener stock guide, and means for adjusting said fastener stock feeding mechanism.

In testimony whereof we have hereunto affixed our signatures in the presence of these witnesses.

GEORGE A. DOBYNE.
JOHN H. BRUNINGA.

Witnesses:
WILLIAM R. ROLLINS,
JOSEPHINE A. MURRIN,
STEPHEN A. DOBYNE,
L. F. MAHLER.

Copies of this patent may be obtained for five cents each, by addressing the "Commissioner of Patents, Washington, D. C."